Aug. 26, 1969  N. QUADREL ET AL  3,463,332

BIN ASSEMBLY

Filed March 21, 1968

INVENTORS:
NICHOLAS QUADREL
LOUIS QUADREL

BY Popper, Bain & Bobis

ATTORNEYS

United States Patent Office 3,463,332
Patented Aug. 26, 1969

3,463,332
BIN ASSEMBLY
Nicholas Quadrel, 168 Colonia Road, Colonia, N.J. 07067, and Louis Quadrel, 115 Christopher St., Montclair, N.J. 07042
Filed Mar. 21, 1968, Ser. No. 715,054
Int. Cl. B65g 1/60
U.S. Cl. 214—16                                   4 Claims

ABSTRACT OF THE DISCLOSURE

A bin assembly in which there is a storage compartment having a plurality of superposed bins, each of which has a separate batch input and a separate, controlled batch outlet means for: (a) discharging material from a superposed bin into the next lower bin; or (b) discharging material from a superposed bin to by-pass the lower compartment or bin; or (c) discharging material from any bin into a system.

Prior art

Silos for the storage of material are frequently designed for storing in one place, in separate bins, several batches of the same or different material. Provision is made for adding the contents of one bin to another, often for mixing purposes. If one batch is defective, the lower bins must be emptied of good material before the defective batch can be removed.

Summary of the invention

It has been found that a silo with separate compartments, or superposed storage bins, can be provided with conduits arranged to alternatively deposit material from either one compartment to the other, or discharge material. Thus, if material in one compartment is discovered to be contaminated or otherwise defective, it can be discharged directly from the particular bin without the necessity of routing it through lower compartments that have, of necessity, been first emptied in order to provide a discharge course. Likewise, material can be selectively drawn from any bin or bins, while leaving any other bin or bins untapped. These objects and advantages as well as other objects and advantages may be achieved by the device shown by way of illustration in the drawings.

Description of preferred embodiment

Figure 1:
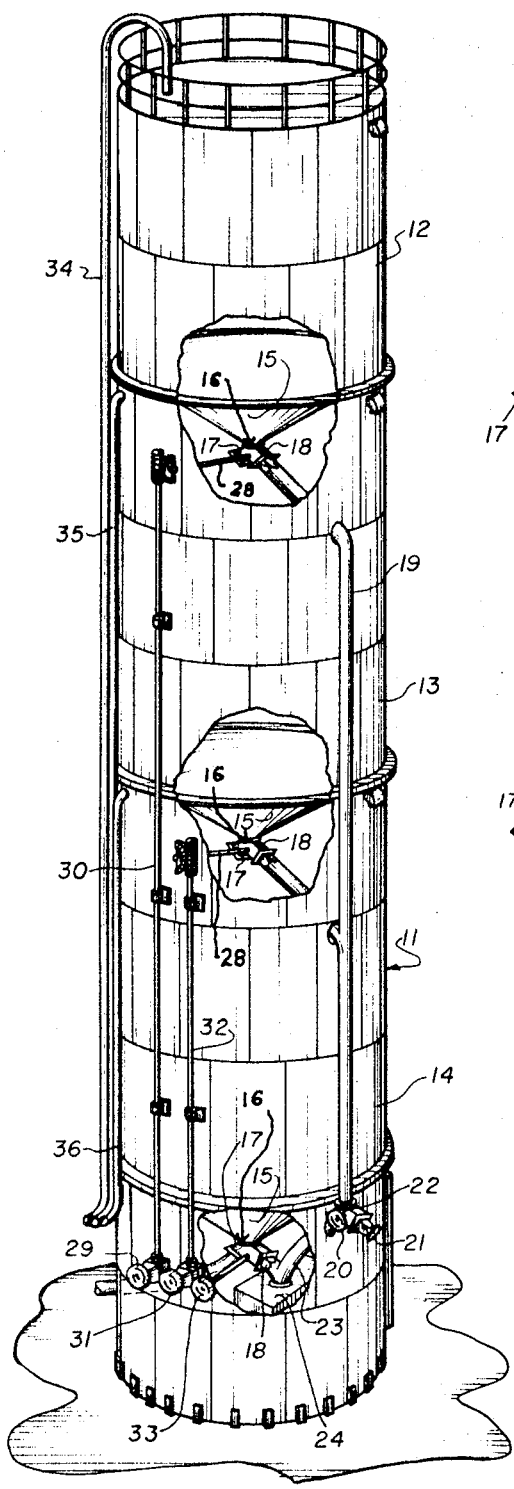
FIGURE 1 is a perspective view of a silo, with portions of the walls exploded away to show the internal structure of the compartments, conduits, and valves.

Referring now to the drawings in detail, there is shown a series of superposed bins arranged as in a silo 11. There is a top bin 12, a middle bin 13, and a bottom bin 14. Each of the bins is provided with a concave, funnel-like floor 15 to ensure positive gravitational draining of solid or pulverulent material. Each of the floors 15 is provided with a terminal, bifurcated discharge duct 16. The terminal, bifurcated discharge duct 16 has one discharge leg 17 that is open, and delivers material to a bin 13 (or 14) immediately below.

The terminal discharge ducts 16 each have another leg 18 which conducts material from the bins 12, 13 to a discharge line 19. A bifurcated duct 20 at the bottom of the discharge line 19 permits the contents of the top bin 12, or the middel bin 13, to be sent to waste through the discharge orifice 21 or into the system through the leg 22 into the conduit 23. The top bin 12 may also discharge material through the discharge leg or orifice 17 into the middle bin 13. The middle bin 13 may discharge material through the discharge leg or orifice 17 into the lower bin 14. The lower bin 14 may discharge material through the discharge leg or orifice 17, or into the system through the other leg 18, via the lower part of the duct 23, and into the system through the charging duct 24.

Figure 2:
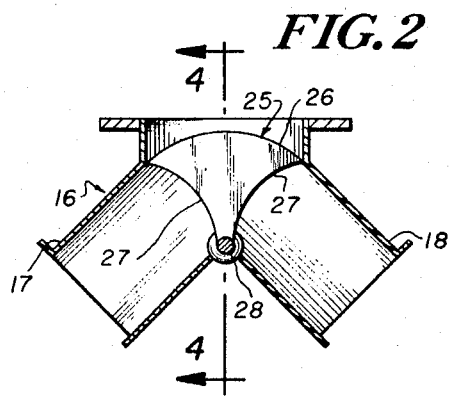
FIGURE 2 is a vertical, sectional, side view of a discharge conduit leading from a compartment or bin, showing a valve in closed position.
Figure 3:
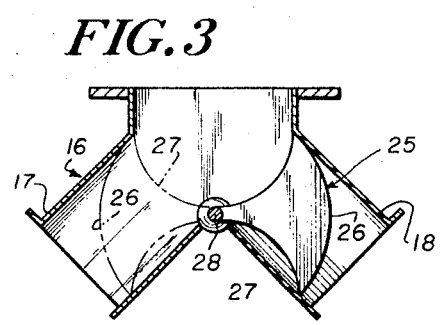
FIGURE 3 is a vertical, sectional, side view of the discharge conduit, shown in FIGURE 2, with the valve alternatively disposed (solid lines and dotted lines) to open either of two discharge conduits for material in a bin.
Figure 4:
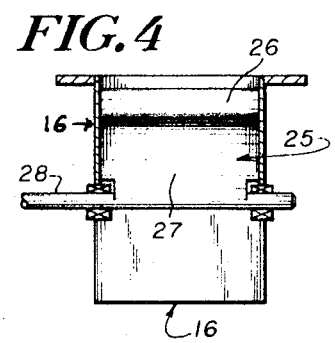
FIGURE 4 is a vertical, sectional, end view taken on the line 4—4 in FIGURE 2, looking in the direction of the arrows.

Each of the terminal bifurcated discharge ducts 16 is governed by a valve 25 having a semi-circular top surface 26 normal to the edges of the bifurcated duct 16 during rotation, and just wide enough to block the entrance to both legs 17, 18. The undersides 27 of the valve 25 are arcuately undercut to permit smooth, unimpeded discharge of material when the valve 25 is pivoted to the positions shown in FIGURE 3. The bottom of the valve 25 is provided with an axial passage and is mounted for rotation on an axle 28. The axle 28 is mounted in the bottom of the terminal discharge duct 16, so that as the valve 25 is rotated, it assumes the closed position shown in FIGURE 2, or either of the alternative open positions shown in FIGURE 3, to unblock either of the legs 17, 18.

The valve 25 at the bottom of the top bin 12 is controlled by the wheel 29 through the rod or shaft 30 connected to a worm and pinion on the axle 28. The valve 25 of the middle bin 13 is controlled by the wheel 31 through the rod shaft 32 also connected to a worm and pinion on the axle 28. The wheel 33 controls the valve 25 at the bottom of the lower bin 14.

Input of material to the top bin 12 is made through the conduit 34, to the middle bin 13 through the conduit 35, and to the bottom bin 14 through the conduit 36. By reason of the arrangement, any bin 12, 13, 14 can be charged independently of any other bin. Either bin 12, 13 can be discharged into any bin immediately below it. The contents of any bin can be sent to the system charging duct 24. Also, the contents of the top and middle bins 12, 13 can be sent to waste or caused to by-pass the system without mixing its material with any other material of other bins through the discharge orifice 21 or the open leg 17 on the lower bin 14. The design produces great flexbility of handling the contents of any bin. Additional bins may be used, either superposed, or in side-by-side arrangement.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What is claimed is:
1. A bin assembly comprising
   (a) a plurality of superposed bins,
   (b) separate charging ducts connected to each bin for introducing material therein,
   (c) bifurcated discharge ducts for gravitational discharge of material from each bin connected at the bottom of each bin,
   (d) valve means in each discharge duct movable to obstruct discharge of material through the duct, and movable to pass material into either of the bifucations of the discharge duct.
   (e) one of the bifurcations of each discharge duct above the lowest bin open to discharge material from that bin into the next lower bin,

(f) the other of the bifurcations of each discharge duct above the lowest bin connected to a by-pass duct,
(g) the other of the bifurcations of the discharge duct of the lowest bin connected to a system charging duct,
(h) a bifurcated discharge duct in the by-pass connected to the system charging duct,
(i) a valve means in the bifurcated discharge duct of the by-pass, and
(j) means to operate each of the valve means.

2. A bin assembly according to claim 1 in which the means to operate the valve means comprises
   (a) control wheels for each of the valve means of the bifurcated discharge ducts,
   (b) connections between the control wheels and valve means to adjust the valve means to various positions selected.

3. A bin assembly according to claim 1 in which the valve means in each bifurcated duct comprises
   (a) an axle rotatably mounted in the bifurcated duct,
   (b) a valve mounted for rotation with the axle,
   (c) an arcuate top surface of the valve normal to the entrance edge of the bifurcations,
   (d) an arcuate undercut portion of the valve beneath the top surface defining a smooth discharge path for material passing through the bifurcated duct when the valve is moved to pass material into either of the bifurcations.

4. A bin assembly according to claim 1 in which the bifurcated discharge ducts, the by-pass, and the connections therebetween extend from the bins in a general downward direction to encourage gravitational discharge of material therein.

References Cited
UNITED STATES PATENTS

| | | | |
|---|---|---|---|
| 1,294,566 | 2/1919 | Sundberg | 214—16 |
| 1,342,418 | 6/1920 | Brahtz | 214—16 |

ROBERT G. SHERIDAN, Primary Examiner

U.S. Cl. X.R.

52—195, 197; 193—31